Dec. 24, 1929. K. DONAT 1,740,443
METHOD OF AND APPARATUS FOR MELTING OR FUSING GLASS, QUARTZ, OR
CERAMIC MATERIALS INTO METAL CAPS AND SIMILAR METAL ARTICLES
Filed Oct. 16, 1926
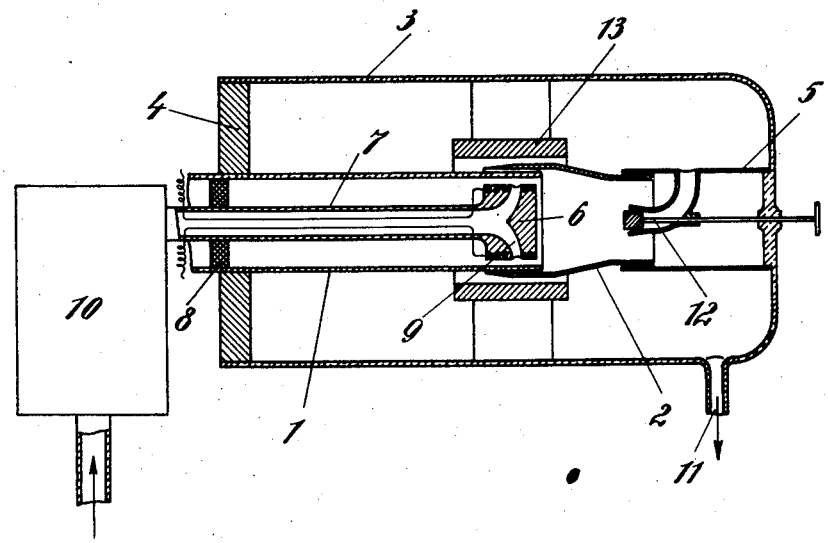
Inventor
Karl Donat
by Knight Br
attorneys Patented Dec. 24, 1929

1,740,443

UNITED STATES PATENT OFFICE

KARL DONAT, OF BERLIN-CHARLOTTENBURG, GERMANY, ASSIGNOR TO SIEMENS-SCHUCKERTWERKE GESELLSCHAFT MIT BESCHRÄNKTER HAFTUNG, OF SIEMENS-STADT, NEAR BERLIN, GERMANY, A CORPORATION OF GERMANY

METHOD OF AND APPARATUS FOR MELTING OR FUSING GLASS, QUARTZ, OR CERAMIC MATERIALS INTO METAL CAPS AND SIMILAR METAL ARTICLES

Application filed October 16, 1926, Serial No. 142,135, and in Germany October 17, 1925.

My invention relates to a method of and apparatus for melting or fusing glass, quartz or ceramic materials into metal caps and similar metal articles.

According to my invention the place where the melting together of the two materials takes place is heated by the aid of a hot current of gas. If a reducing gas is employed for the purpose, the oxidation of the metal cap or the like at the place of fusing may easily be prevented. As reducing gases hydrogen and illuminating gas come, for instance, into consideration. In order to effect the heating of the fusing place in a reducing gas, a highly heated inert or reducing gas is according to my invention conducted to the fusing place and thus this place heated by the current of gas. It will be understood that instead of employing heated gases the fusing place may also be heated electrically or that the two heating means may be combined.

The drawing affixed hereto illustrates one embodiment of my invention, in which the fusing place is partly heated by hot gases and partly electrically. Both kinds of heating may be operated independently, but the electric heating may also be employed for assisting the heating by heated gases.

In the drawing which represents a longitudinal vertical section through the apparatus, 1 is a glass tube which is to be fused into or welded together with a metal cap 2 in a vacuum-tight manner. For this purpose the glass tube 1 is fixed in the shell 3 by means of the closing member 4. The metal cap 2 is mounted in the other end of the shell 3 by means of a tube 5 in such a manner that it takes up the desired position in relation to the glass tube 1. In the interior of the glass tube 1 is located the elecrically heated heating body 6 adapted to be moved axially by means of the tube 7. The interior of the tube 1 is sealed against the outer air by the packing 8 in which the tube 7 can be rotated. With the interior of the tube 7 communicate the ducts 9 which issue radially from the heating body. 10 is an electric heating apparatus for heating the gases which are conducted into the tube 7 and 11 is a discharge pipe through which the gases escape from the interior of the shell 3. 13 is a protective jacket or ring which reduces heat losses by radiation at the place of fusing.

My device operates in the following manner: The fusing place is slowly heated by means of the electric heating body 6 or by hot gases which are conducted from the heating apparatus 10 through the tube 7 and ducts 9 against the fusing place. By increasing the supply of energy the temperature of the fusing place may be raised to such an extent that the glass at the fusing place becomes soft and expands into close contact with the metal cap owing to the pressure prevailing in the tube 1. The fusing together of the two parts then takes place by further raising the temperature. To prevent excessive inflation of the glass wall a valve 12 adapted to be regulated from the outside may be provided through which gas from the interior of the tube may escape through discharge pipe 11 into the atmosphere.

Various modifications and changes may be made without departing from the spirit and the scope of the invention, and I desire, therefore, that only such limitations shall be placed thereon as are imposed by the prior art.

I claim as my invention:—

1. In the method of melting together glass, quartz or ceramic materials with metal parts, heating the fusing place by means of a current of hot gas assisted by an electric heating device.

2. In the method of melting together glass, quartz or ceramic materials with metal parts, heating the fusing place by means of a current of a hot reducing gas assisted by an electric heating device.

3. In apparatus for fusing together glass, quartz or ceramic materials with metal caps, in combination, a shell closed at one end, a central tube at the closed end for supporting said metal cap, a closing member at the open end of said shell for centrally supporting the glass tube with its end within said cap, a closing member for said glass tube, a tube slideably supported in said closing member and adapted to lead a current of hot gas to the fusing place.

4. In apparatus for fusing together glass, quartz or ceramic materials with metal caps, in combination, a shell closed at one end, a central tube at the closed end for supporting said metal cap, a closing member at the open end of said shell for centrally supporting the glass tube with its end within said cap, a closing member for said glass tube, a tube slideably supported in said closing member and adapted to lead a current of gas to the fusing place and an electric gas heating apparatus inserted in said tube.

5. In apparatus for fusing together glass, quartz or ceramic materials with metal caps, in combination, a shell closed at one end, a central tube at the closed end for supporting said metal cap, a closing member at the open end of said shell for centrally supporting the glass tube with its end within said cap, a closing member for said glass tube, a tube slideably supported in said closing member and adapted to lead a current of gas to the fusing place, an electric gas heating apparatus inserted in said tube, and an electric heating body closing the inner end of said tube and provided with radial ducts adapted to lead the gas against the fusing place.

6. In apparatus for fusing together glass, quartz or ceramic materials with metal caps, in combination, a shell closed at one end, a central tube at the closed end for supporting said metal cap, a closing member at the open end of said shell for centrally supporting the glass tube with its end within said cap, a closing member for said glass tube, a tube slideably supported in said closing member and adapted to lead a current of gas to the fusing place, an electric gas heating apparatus inserted in said tube, an electric heating body closing the inner end of said tube and provided with radial ducts adapted to lead the gas against the fusing place, and a protective bushing around said place adapted to reduce the loss of heat by radiation.

7. In apparatus for fusing together glass, quartz or ceramic materials with metal caps, in combination, a shell closed at one end, a central tube at the closed end for supporting said metal cap, a valve in said tube adapted to be operated from outside, a closing member at the open end of said shell for centrally supporting the glass tube with its end within said cap, a closing member for said glass tube, a tube slideably supported in said closing member and adapted to lead a current of gas to the fusing place, an electric gas heating apparatus inserted in said tube, and an electric heating body closing the inner end of said tube and provided with radial ducts adapted to lead the gas against the fusing place.

8. In the method of fusing metal parts together with glass, quartz or ceramic materials plastic at high temperatures, the heating of the fusing point by means of a gas current heated to the desired fusing temperature before it reaches the fusing point.

9. In the method of fusing metal parts together with glass, quartz or ceramic materials plastic at high temperatures, the heating of the fusing point by means of a reducing gas current heated to the desired fusing temperature before it reaches the fusing point.

10. In the method of fusing metal parts together with glass, quartz or ceramic materials plastic at high temperatures, the heating of the fusing point by means of a gas current heated to the desired fusing temperature before it reaches the fusing point, the heating of the fusing point being assisted by an electric heating device.

11. In the method of fusing metal parts together with glass, quartz or ceramic materials plastic at high temperatures, the heating of the fusing point by means of a reducing gas current heated to the desired fusing temperature before it reaches the fusing point, the heating of the fusing point being assisted by an electric heating device.

In testimony whereof I affix my signature.

KARL DONAT.